United States Patent
Flach et al.

(10) Patent No.: US 9,126,756 B2
(45) Date of Patent: Sep. 8, 2015

(54) CARD MASS STORAGE DEVICE, CARD TRANSPORT, AND CARD STORAGE DEVICE, AS WELL AS SORTING METHOD FOR CARDS

(71) Applicant: Boewe Systec GmbH, Augsburg (DE)

(72) Inventors: Boris Flach, Langenneufnach (DE);
Helmut Koelle, Augsburg (DE)

(73) Assignee: Boewe Systec GmbH, Augsburg (DE)

( * ) Notice: Subject to any disclaimer, the term of this patent is extended or adjusted under 35 U.S.C. 154(b) by 38 days.

(21) Appl. No.: 14/021,180

(22) Filed: Sep. 9, 2013

(65) Prior Publication Data

US 2014/0069772 A1 Mar. 13, 2014

(30) Foreign Application Priority Data

Sep. 10, 2012 (DE) .......................... 10 2012 017 786

(51) Int. Cl.
| | |
|---|---|
| *B65G 1/00* | (2006.01) |
| *B65G 1/04* | (2006.01) |
| *G06K 13/08* | (2006.01) |
| *B65H 29/38* | (2006.01) |
| *B65H 29/40* | (2006.01) |
| *B65H 29/46* | (2006.01) |
| *B65H 1/02* | (2006.01) |
| *B65H 3/24* | (2006.01) |
| *B65G 47/51* | (2006.01) |
| *B07C 5/00* | (2006.01) |
| *G06K 13/14* | (2006.01) |

(52) U.S. Cl.
CPC ... *B65G 1/04* (2013.01); *B07C 5/00* (2013.01); *B65G 47/5113* (2013.01); *B65H 1/02* (2013.01); *B65H 3/24* (2013.01); *B65H 29/38* (2013.01); *B65H 29/40* (2013.01); *B65H 29/46* (2013.01); *G06K 13/08* (2013.01); *G06K 13/14* (2013.01); *B65H 2301/321* (2013.01); *B65H 2301/4476* (2013.01); *B65H 2301/44765* (2013.01); *B65H 2404/312* (2013.01); *B65H 2404/656* (2013.01); *B65H 2405/352* (2013.01); *B65H 2405/354* (2013.01); *B65H 2405/52* (2013.01); *B65H 2701/1914* (2013.01)

(58) Field of Classification Search
CPC .......... B65G 47/5113; B65G 47/5136; B65G 47/5177; B65G 47/5186
USPC ...................... 198/347.1, 347.2, 347.3, 347.4
See application file for complete search history.

(56) References Cited

U.S. PATENT DOCUMENTS

| | | | | |
|---|---|---|---|---|
| 5,415,280 | A * | 5/1995 | Balboni et al. | 198/435 |
| 5,964,562 | A * | 10/1999 | Bernard et al. | 198/347.3 |
| 6,832,679 | B2 | 12/2004 | Berndtsson | |
| 8,215,474 | B1 * | 7/2012 | Van Brunt et al. | 198/347.1 |
| 8,820,512 | B2 * | 9/2014 | Sugiura et al. | 198/347.1 |
| 2002/0017481 | A1 | 2/2002 | Johnson et al. | |

(Continued)

FOREIGN PATENT DOCUMENTS

| | | |
|---|---|---|
| DE | 100 36 715 A1 | 2/2002 |
| DE | 102 61 472 A1 | 7/2004 |

(Continued)

*Primary Examiner* — James R Bidwell
(74) *Attorney, Agent, or Firm* — Collard & Roe, P.C.

(57) ABSTRACT

In the case of a card mass storage device having a storage device and a card transfer, the storage device includes a main storage device and an interim storage device, which is disposed between the main storage device and the card transfer, to allow sorting processes that make implementing rapid access possible.

13 Claims, 3 Drawing Sheets

(56) References Cited

U.S. PATENT DOCUMENTS

2010/0080673 A1* 4/2010 Von Der Waydbrink et al. .......... 198/347.1
2014/0124331 A1* 5/2014 Fukushima ................ 198/347.2

FOREIGN PATENT DOCUMENTS

DE    10 2004 053 027 B4    2/2012
WO            98/35324 A1    8/1998

* cited by examiner

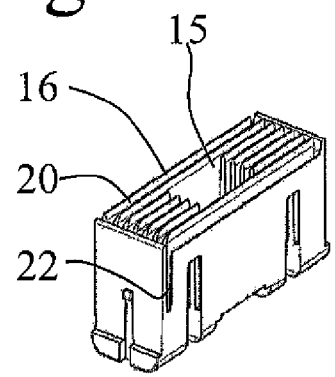
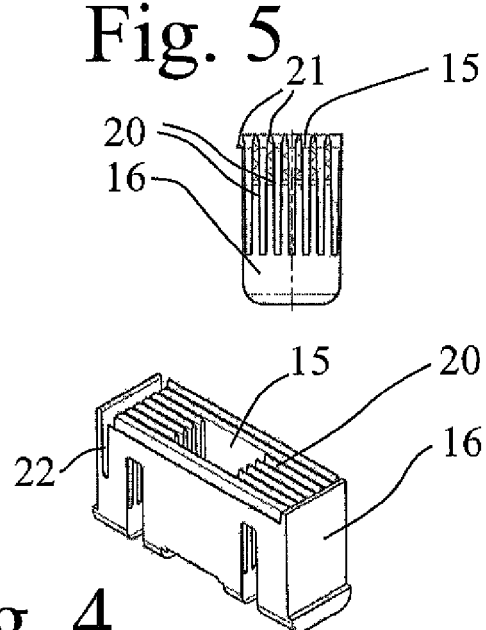
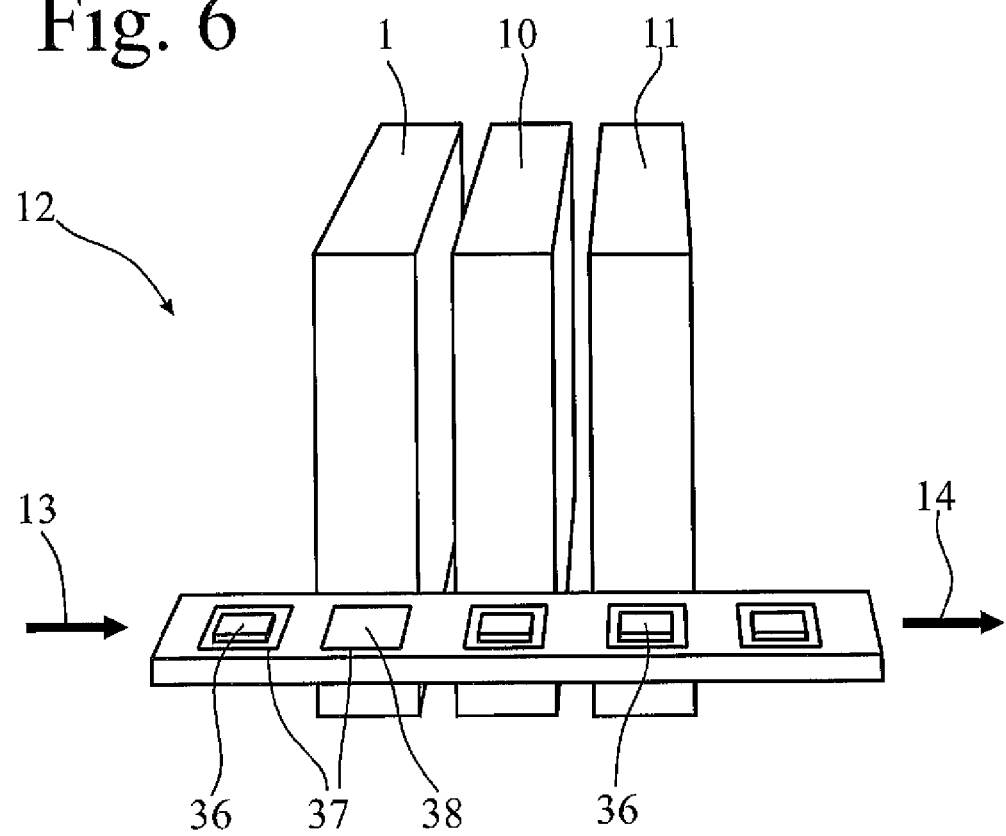

CARD MASS STORAGE DEVICE, CARD TRANSPORT, AND CARD STORAGE DEVICE, AS WELL AS SORTING METHOD FOR CARDS

CROSS REFERENCE TO RELATED APPLICATIONS

Applicant claims priority under 35 U.S.C. §119 of German Application No. 10 2012 017 786.0 filed Sep. 10, 2012, the disclosure of which is incorporated by reference.

BACKGROUND OF THE INVENTION

1. Field of the Invention

The invention relates to a card mass storage device, a card transport, and a card storage device, as well as a method for sorting of cards.

2. Description of the Related Art

In one aspect, the invention relates to a card mass storage device having card holders disposed on a circulating card holder support that is movable in itself, or having a storage device, and having a card transfer for input of cards into the card mass storage device and for output of cards from the card mass storage device, such as these devices are disclosed, for example, in DE 100 36 715 A1.

Furthermore, the invention relates to a card transport having a conveyor section and having at least one storage device, as these devices are also disclosed, for example, in DE 100 36 715 A1.

The invention also relates to a card storage device having multiple addressable card holders.

Furthermore, the invention relates to a method for sorting of cards, which preferably pass through a conveyor section, using a storage device that has multiple card spaces.

Sorting of cards and corresponding storage devices are also known from US 2002/0017481 A1, whereby here, playing cards are sorted accordingly, and then output as a stack of playing cards, so that ultimately, precise allocation of the cards is lost, which is ultimately unimportant for playing cards or stacks of playing cards.

WO 98/35324 A1 also discloses a sorting apparatus; however, this apparatus is for sorting of paper money. Here, too, the precise allocation of the bills is lost upon output because ultimately, the sequence in which specific bills are output is unimportant to a customer or in a till, particularly if they have the same value.

In connection with the present description, it should be emphasized that in particular, debit cards, credit cards or similar cards are used as cards. Likewise, SIM cards or chips, particularly telephone chips, can be married to card media accordingly, as cards. In this regard, in the present connection, the term "cards" particularly comprises planar bodies, inherently rigid in themselves, which are not larger than 10 by 10 cm. In the case of such cards, which generally contain personalized data, it is particularly important that these can be allocated correctly, so that the protection of personal data can be guaranteed to the greatest possible extent.

SUMMARY OF THE INVENTION

It is the task of the present invention to configure the apparatuses and methods in such a manner that the shortest possible access times and therefore the fastest possible cycle times can be implemented.

Thus, a card mass storage device having card holders disposed on a circulating card holder support that is movable in itself can be characterized so that at least two card holders are disposed on a first holding element, rigidly relative to one another, and at least two further card holders are disposed on a second holding element, rigidly relative to one another, and that the two holding elements are disposed on the card holder support, movable relative to one another. In this manner, the individual cards can be stored in card holders disposed tightly relative to one another, because they are disposed on a holding element with at least one other card holder, and nevertheless can be configured to be sufficiently stable. In this manner, the card holders can be disposed very tightly relative to one another, if suitably configured, thereby making it possible to reduce the individual access times to a minimum, because the distance for getting from one card holder to the next is restricted to a minimum.

Preferably, each card holder comprises a card guide that preferably serves to guide a card during its introduction into the card holder or during its removal from the card holder, whereby for at least one card holder of a first holding element, a part of the card guide is provided on a second, adjacent holding element. In this manner, the card holders of adjacent holding elements can be disposed very tightly next to one another, thereby making it possible to optimize the density of the card holders in the mass storage device and therefore also the access time.

The card mass storage device has a particularly compact construction if a card transfer is disposed in a linear region of the card holder support, in which region the movable card holder support is guided in a straight line. In particular, if the card mass storage device is suitably configured, the possibility then exists of providing a corresponding card transfer or parts of same within the circulating card holder support. Such a configuration is advantageous also in the case of a card mass storage device having card holders disposed on a circulating card holder support that is movable in itself, independent of the other characteristics of the present invention.

Not only a card input but also a card output, or a card input and output, can be provided as a card transfer. In particular, a device of the card transfer that interacts with a card, abutting it from the inside, can easily be disposed in such a linear region, in the interior of a circulating card holder support.

Preferably, each card holder comprises card clamping means with which a card can be clamped in its position in the card holder, in each instance. This arrangement also makes it possible to move the card holders relatively quickly at any deflection points, without the cards departing from the card holders as the result of centrifugal forces. This arrangement accordingly makes it possible to move the card mass storage device correspondingly quickly, and again, the access times are optimized accordingly as a result.

Such card clamping means can particularly be used alternatively or cumulatively with other measures with which cards can be positioned in the card holders. For example, corresponding positioning can also take place by means of guide rails, which are disposed to lie opposite the card holders and do not circulate with them, and prevent the cards from leaving the card holders simply by their presence; in the region of card transfers, such guide rails can then be open or can be configured so as to open.

Preferably, the card clamping means are disposed to the side of the card spaces, in each instance, and act on the lateral edges of the card, in each instance. Because such cards are generally very narrow, possible friction traces there cannot permanently damage the card itself. Preferably, a card guide lies at the front and the rear of each card space. In this way, card guide and card clamping means do not reciprocally impair one another. On the other hand, it should be understood that—particularly if suitable material pairings between cards and card clamping means are present—the card clamping means can also engage on the cards, in each instance, on the front and on the rear. In this way, clamping takes place by way of the card surface itself.

Depending on the concrete implementation, the card clamping means can be configured in one piece with the wall of the card holder, for example in that this wall has correspondingly resilient regions, which can have a clamping effect. Likewise, however, it is also possible to use metallic spring and other separate clamping means, which preferably act jointly for an entire holding element, for clamping, so that a card clamping means can have a clamping effect for multiple card spaces. Such a configuration particularly makes an application of the card clamping means on the holding element that is simple in design possible, and serves, on the other hand, also for stabilization, because not only the card clamping means themselves but also their connection with the holding element does not have to be configured too delicately.

Furthermore, it should be understood that the card clamping means can be configured to interact with the cards merely with friction bias, which is relatively simple, in terms of design. On the other hand, it is also possible to configure the card clamping means to be active, so that they perform a clamping or closing movement when a card is introduced into a card holder. In this way, possible friction on a card and damage caused as a result can be restricted to a minimum.

Also, a card mass storage device having a storage device and a card transfer for input of cards into the card mass storage device and for output of cards from the card mass storage device can be characterized so that the storage device is a main storage device having a number of card spaces, and that an interim storage device that has at least two card spaces and not more card spaces than the main storage device is disposed between the main storage device and the card transfer.

By way of such an interim storage device, cards can be transferred into the main storage device in pre-sorted manner, or presorted accordingly during output. In this manner, possible access times that are necessary to be able to access cards in the main storage device can be minimized. In this connection, it should be understood that a separate card transfer, configured solely for this purpose, is preferably provided between the main storage device and the interim storage device. In this way, card transfer between the main storage device and the interim storage device, in particular, can take place independent of a card transfer into the card mass storage device itself.

Such a design particularly also makes it possible to carry out sorting processes between the main storage device and the interim storage device, without the card transfer to the card mass storage device being affected by these processes.

This feature also makes independent sorting possible, by means of which access times can ultimately be reduced.

It is true that purely technically, it is also feasible that the interim storage device has more card spaces than the main storage device. In terms of organization, however, this arrangement makes little sense, because then it is difficult to optimize the access times for the interim storage device. Under some circumstances, however, it is possible to carry out such a configuration, too, particularly as long as sorting processes can be carried out by way of a card transfer provided between the interim storage device and the main storage device, which works independent of the card transfer to the card mass storage device itself.

A linear main storage device in which one card holder is accordingly disposed behind the other appears to have a particularly simple construction. Here, it is advantageous to configure at least the main storage device in ring-like manner, whereby this configuration can also apply to the interim storage device, in order to maximize the access times, because then, faster access times can ultimately be implemented, if the remainder of the design is suitable, in each instance.

Also, a card mass storage device having a storage device ring as a storage device and a card transfer for input of cards into the card mass storage device and for output of cards out of the card mass storage device can be characterized so that the storage device ring is a main storage device ring as a main storage device and an interim storage device ring is disposed between the main storage device ring and the card transfer as an interim storage device. The ring-like configuration makes relatively rapid movements possible, which, in terms of their speed, would be much more difficult to implement with straight-line arrangements or would require more complicated constructions. Accordingly, the access time for individual cards can be minimized, on average, in this way.

Preferably, main storage device ring or main storage device and interim storage device ring or interim storage device have separate drives, so that individual card spaces can be approached in targeted manner. In this way, sorting can be made possible in relatively simple structural manner.

To further minimize access times or to correspondingly minimize sorting times, it is advantageous if the interim storage device or the main storage device and accordingly, if applicable, the main storage device ring and/or the interim storage device ring have a reversal of the direction of rotation provided in their drive, in each instance. In this manner, the paths to individual card spaces can be minimized, and this minimization applies accordingly also for the access times and any sorting times. Such a reversal of the direction of rotation is therefore also advantageous for a storage device that comprises a circulating card holder support that is movable in itself, and card holders disposed on this support, whether the storage device is used as a main storage device or as an interim storage device or as a stand-alone device.

Preferably, the card transfer to the card mass storage device has separate transfer spaces. As a result, input or output of cards can take place independent of the position of the individual card holders of the card mass storage device. Thus, for example, sorting processes can take place while at the same time, a card conveyor moving past the card mass storage device conveys a card toward the card transfer or away from the latter. Only during card transfer itself does a corresponding card space have to be made available by the card mass storage device. The same holds true accordingly for the related card conveyor; it must simply be ensured that no malfunctions occur during card transfer. It should be understood that in an alternative embodiment, the card transfer can have merely one transfer space, which is comparatively simple in terms of construction, but leads to the result that a card conveyor or some other removal or feed of a card, for example, can work appropriately only if the related card holder is standing still. In this regard, a corresponding storage device cannot perform any sorting movement or other displacement movement of the card holders during this time.

Also in the case of main storage devices or interim storage devices configured in ring shape, it is advantageous if a further card transfer that works independent of the card transfer to the card mass storage device is provided between them. This arrangement particularly makes sorting processes possible even independent of a card transfer to the card mass storage device itself.

Preferably, the interim storage device and the main storage device have card spaces, in each instance, and the number of card spaces of the interim storage device ring amounts to less than 10% of the number of card spaces of the main storage device ring. The interim storage device accordingly serves really only for interim storage and sorting, while the actual storing function is performed by the main storage device. In this connection, it is particularly also possible that the number of card spaces of the interim storage device amounts to less than 5%, preferably less than 3% of the number of card spaces of the main storage device. In this way, it can also be particularly guaranteed that the interim storage device can rotate relatively quickly, and therefore comparatively fast access times of the card mass storage device itself can be implemented. This relatively quick rotation is already made possible solely by the lesser mass that must be moved.

Short access times can particularly be implemented if the card spaces of the interim storage device are disposed rigidly relative to one another. It is true that at first glance, such an arrangement might correspond to the arrangement according to DE 102 61 472 A1. This arrangement, however, is intended for processing of cards, so that here, an interim storage device in the narrower sense does not exist, as such, and instead, only the time during which a card lies against the corresponding work device is supposed to be maximized with an arrangement that is as small as possible. In this regard, this arrangement is not a card mass storage device, because by its nature such a device is not intended to fulfill a storage function.

In particular, this arrangement does not allow any free addressability of the card spaces, in each instance, and therefore does not allow any kind of sorting function. In this arrangement, the drive is also not configured to be reversible.

Accordingly, the present card mass storage device can approach or also not approach individual card spaces in targeted manner, something that is specifically not possible in the case of the arrangement according to DE 102 61 472 A1.

Card wheels, for example also with suction cups disposed in star shape or with slit-shaped card holders, can advantageously be used, however, as card storage devices having card spaces disposed rigidly relative to one another, as long as these devices are designed to be able to approach or also not approach individual card spaces. For this purpose, selective card transfer into the interim storage device or out of it is then also advantageous, accordingly.

Likewise, card boxes having multiple card spaces, which are essentially disposed in linear manner, can be used as intermediate storage devices. Such a card box can be moved on an arm or on a linear guide, for example, in order to bring individual card spaces of the interim storage device into an interaction position with a card transfer, in each instance.

Preferably, the card mass storage device comprises at least one further main storage device as well as a direct or indirect card transfer between the interim storage device and the two main storage devices, in each instance, and/or between the two main storage devices relative to one another. In this regard, sorting into different main storage devices or also between these main storage devices can take place, by way of the interim storage device or, if applicable, also by way of further interim storage devices, in order to then undertake card output as effectively as possible, at a high transfer speed. In particular, of course, the number of card spaces of the card mass storage device can be increased accordingly in this way, in advantageous manner.

Preferably, this direct or indirect card transfer also takes place with separate transfer spaces. In this way, the modules, in each instance, which transfer cards, can be moved independent of one another. Only during card transfer do the card spaces of this module then have to be in a suitable transfer position.

For this purpose, an interim storage device can be provided, particularly per main storage device, because in this way, the flexibility of the entire arrangement is significantly increased. In particular, it is possible that each interim storage device in turn separately has a card transfer to a card conveyor, thereby making it possible to make cards available also at twice the speed.

A sorting possibility can be maximized, in particular, by means of direct or indirect card transfer between the interim storage devices.

The overall arrangement has a particularly compact construction and therefore has fast access times, if the card mass storage device has a storage device having multiple addressable card holders as an interim storage device, whereby the card holders of the interim storage device are disposed rigidly relative to one another and so as to rotate about an axis of rotation, in circular form, and if it comprises a main storage device with card holders disposed on the circulating card holder support that is movable in itself. Very many cards can be stored in well accessible manner in the latter device, while cards can be quickly sorted and made available for card transfer, if necessary, by way of the interim storage device.

In this connection, it should be understood that it is advantageous if the direction of rotation of the interim storage device and/or of the main storage device can be changed, in order to be able to minimize access times.

Preferably, the card holders of the card mass storage device are addressable, in each instance, so that cards can be placed into the card mass storage device and removed from it again, in targeted manner.

If more than one storage device is present in the card mass storage device, it is advantageous if these are individually addressable, so that every card holder has a single, individual address, and every card can be placed in the storage device, re-sorted, and removed from the device again, in targeted manner.

A card transport having a conveyor section and having at least one storage device, such as a card mass storage device, main storage device, or interim storage device as described above, can be characterized so that a card transfer is provided between the storage device and the conveyor section. This transfer comprises a transfer space on the storage device side and a transfer space that deviates from the former, on the conveyor section side. In this manner, the storage device can act independent of the conveyor section, and make card spaces available for transfer. The same holds true for the conveyor section. In this way, time can be gained, particularly for possible sorting processes.

Such conveyer sections frequently work with specific cycling, so that sorting activities and the like can be performed by means of deviation of the transfer spaces during cycling, in other words during a movement of cards or card spaces along the conveyor section. If a card is situated at a transfer space on the conveyor section side during a cycle, then a card transfer can take place accordingly. In this way, sorting processes can then again be performed during a corresponding movement.

In particular, such a card transport, in interplay with a card storage device having multiple addressable card holders disposed rigidly relative to one another and disposed so as to rotate about an axis of rotation, in circular form, as a storage device, and/or with a card mass storage device in which the card holders disposed on the circulating card holder support, which is movable in itself, can work at extremely high access times and therefore with very great cycling, despite a very great number of card spaces.

Accordingly, a card storage device having multiple addressable card holders, which is characterized in that the card holders are disposed rigidly relative to one another and so as to rotate about an axis of rotation, in circular form, is also advantageous.

Preferably, the direction of rotation can be reversed in such a configuration, as well, so that access times or cycle times can be maximized.

The overall arrangement has a particularly compact construction if the card holders that are disposed rigidly relative to one another and so as to rotate about an axis of rotation, in circular form, comprise recesses in a cylindrical base body. In this way, a corresponding card storage device can be made available in structurally very simple and stable manner, which storage device also allows very high access speeds because of its compact construction. In the case of such a configuration it is possible, independent of whether the card holders comprise recesses provided in a base body, for the outer circular path of all the card spaces not to exceed three times the radial depth of a card space in terms of its radius. The latter brings about a structurally very compact arrangement of the corresponding card storage device, and this arrangement accordingly maximizes the access times.

Preferably, at least one card holder is configured in passive manner, in other words the corresponding card holder does not act on the cards, in each instance, in any manner—except to store them. In particular, the storage device itself has a very simple construction in this way, because it is possible to do without complex feed lines, cables, or electrical connections for this card space, which ultimately only increase the mass and thereby would reduce access times. In particular, it is accordingly advantageous if all the card holders are configured to be passive, if possible.

At this point, it should be emphasized that the term "card space" in the present connection refers to the space not only in a storage device in a card holder, but also in a card transport or in a card transfer that is provided for a card. It is therefore the space that must also be delimited by suitable guides and holding or clamping means, in order to securely hold the card in its card space. Likewise, it is the space that must be free during a movement of a card holder, so that the card can be moved without hindrance and also conveyed into the card holder or conveyed out of it.

A method for sorting of cards that pass through a conveyor section, using a storage device that has multiple card spaces, can be characterized so that cards are transferred into the storage device, leaving empty storage device spaces that are filled up later, if necessary, and subsequently transferred out of the storage device into the conveyor section again. This method is particularly advantageous for storage devices that are successively provided with card spaces or in which card spaces are successively brought past a card transfer. In this way, sorting processes can be carried out in simple and targeted manner. For such targeted leaving of spaces, an empty space is brought past a card transfer or a card transfer or a card interim storage device skips an empty space, in order to fill it later, if necessary.

Because such process management is advantageous even independent of a conveyor section, for example if cards are supposed to be transferred into the storage device or removed from it again, with predetermined cycling, a method for sorting of cards, using a storage device that has multiple card spaces, can be characterized so that cards are transferred into the storage device, leaving empty storage device spaces, in targeted manner, which spaces are later filled up, if necessary, and subsequently, preferably in targeted manner and individually, are removed from the storage device again. In this manner, the risk that very great path distances for sorting have to be traveled between the storage device and a card input and/or output that belongs to it can be minimized, so that it is more likely that the storage device performs sufficient sorting processes even within the predetermined cycling or within a predetermined time.

In this connection, targeted and individual transfer of the cards from the storage device into the conveyor section or targeted and individual removal of the cards from the storage device guarantees that, even after transfer in or transfer out, it is precisely known what card was transferred. This feature differs from what is known from US 2002/0017481 A1 for playing cards or from WO 98/35324 A1 for paper money, for example, where this information is lost immediately after output, because stacks are output there, in each instance. In this regard, it can be ensured, even in the case of sorting into a magazine or particularly during further handling of the cards, such as marriage of the cards with a card support, that precisely the desired cards are subjected to this handling.

Also, the method for sorting of cards that pass through a conveyor section, using a storage device that has multiple card spaces, can be characterized so that cards are conveyed past the storage device by way of the conveyor section, if they have already been correctly sorted. This method brings about the result that correctly sorted cards can be made available, without time delay, to units that are conveyed further and lie downstream.

Particularly if the conveyor section goes past the storage device and not through it, a method for sorting of cards that pass through a conveyor section, using a storage device that has multiple card spaces, can be characterized so that empty conveyor spaces are conveyed to the storage device, by way of the conveyor section, and, if necessary, cards are transferred from the storage device to the conveyor spaces. This method brings about the result that cards can be successively conveyed further by the conveyor, without any further delay. In this connection, it is particularly not necessary to plan time for separate removal of cards from conveyor spaces into the schedule.

The sorting methods and apparatuses indicated in DE 10 2004 053 027 34, in particular, in which one or more inputs and inputs or outputs, which are equipped by means of first-in, last-out (FILO) storage devices, in each instance, are disclosed, do not allow corresponding sorting possibilities. Here, manual activities, such as, for example, the transfer of a magazine to a corresponding system or also the insertion of a magazine with cards, which are supposed to be distributed accordingly, are subsequently still shown. In this regard, this is merely a distributor, not a sorter.

Also, a method for sorting of cards that pass through a conveyor section, using a card storage device that has multiple card spaces, and a card mass storage device having a main storage device and an interim storage device, in which cards are first re-sorted or pre-sorted according to card information, such as a card color, for example, or card features, then transferred from the conveyor section into the storage device, particularly the main storage device, in pre-sorted manner, and subsequently transferred from the storage device into the conveyor section, in sorted manner, can be characterized so that the storage device is the main storage device and that sorting takes place during the transfer of cards from the storage device into the conveyor section, using the interim storage device. This method management makes it possible to load cards without matching card jobs into the storage device, at first, in order to subsequently assign the jobs to the cards, in accordance with the stored cards, and then to output the cards, appropriately pre-sorted. In this way, method management is significantly facilitated as compared with the method disclosed in DE 10 2004 053 027 B4, in which a corresponding assignment must already have taken place.

Preferably, transfer takes place into the main storage device, in each instance, so that correspondingly great numbers of cards can be kept available.

Furthermore, a method for sorting of cards that pass through a conveyor section, using a card storage device having a main storage device and an interim storage device, can be characterized so that the cards are first transferred from the conveyor section to the main storage device, by way of the interim storage device, and subsequently transferred back to the conveyor section from the main storage device, by way of the interim storage device. Here, too, it is advantageous if main storage device and interim storage device have the characteristics indicated above. In this way, correspondingly rapid transfer and therefore, accordingly, even further reduced cycle times become possible.

Depending on the concrete situation, it can be advantageous, in this connection, if the cards are re-sorted from the main storage device back into the main storage device, by way of the interim storage device. In this manner, time can be saved during a subsequent card transfer to the conveyor section, so that here, too, optimal cycle times can be guaranteed.

Furthermore, the cards can be transferred to the main storage device in pre-sorted manner, if they are transferred from the conveyor section into the main storage device by way of the interim storage device, so that possible re-sorting can be restricted to a minimum.

Likewise, it is possible to transfer the cards from the main storage device in sorted manner, before they are transferred to the conveyor section. In this way, it becomes possible, in particular, to reduce the cycle times with which the transfer between interim storage device and conveyor section takes place, to a minimum.

In this connection, cards to be sorted into the conveyor section, one after the other, can be sorted into different main storage devices and/or interim storage devices, if multiple main storage devices and interim storage devices are present, so that they can then be output more or less in parallel from the main storage device and/or interim storage device into the conveyor section. Alternatively or cumulatively, such cards can already be transferred to a main storage device, tightly next to one another, so that then, they can also be transferred out again, without complicated movement of the corresponding main storage device. In the present connection, the term "tightly" means that the corresponding card spaces can be reached within a cycle time of the conveyor section, so that accordingly, the subsequent card can be made available without delay.

Such tight introduction, next to one another, of cards into a main storage device particularly makes sense if a mass storage device is almost full and therefore only limited sorting possibilities exist.

The present method management approaches particularly make it possible to transfer cards into an interim storage device in completely re-sorted manner, and then to output them in sorted manner, if necessary after shipping information has been assigned to these cards by way of suitable data processing. If necessary, pre-sorting can be carried out using specific card characteristics, for example a card color, an imprint or possible chip information, which can be read out from a card by means of image detection or another sensor system, without assignment of these cards to possible shipping information already taking place. This assignment can then happen at a later point in time.

It is understood that the characteristics of the solutions described above and in the claims can also be combined, if applicable, in order to be able to implement the advantages in correspondingly cumulative manner.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings,

FIG. 3 is a perspective representation of a holding element of the card mass storage device according to FIGS. 1 and 2, having seven card holders;

FIG. 4 shows the holding element according to FIG. 3 in a different perspective;

FIG. 5 is a section through the holding element according to FIGS. 3 and 4;

FIG. 6 is a schematic front view of a card conveyor having three card mass storage devices according to FIGS. 1 and 5.

DETAILED DESCRIPTION OF PREFERRED EMBODIMENTS

Figure 1:
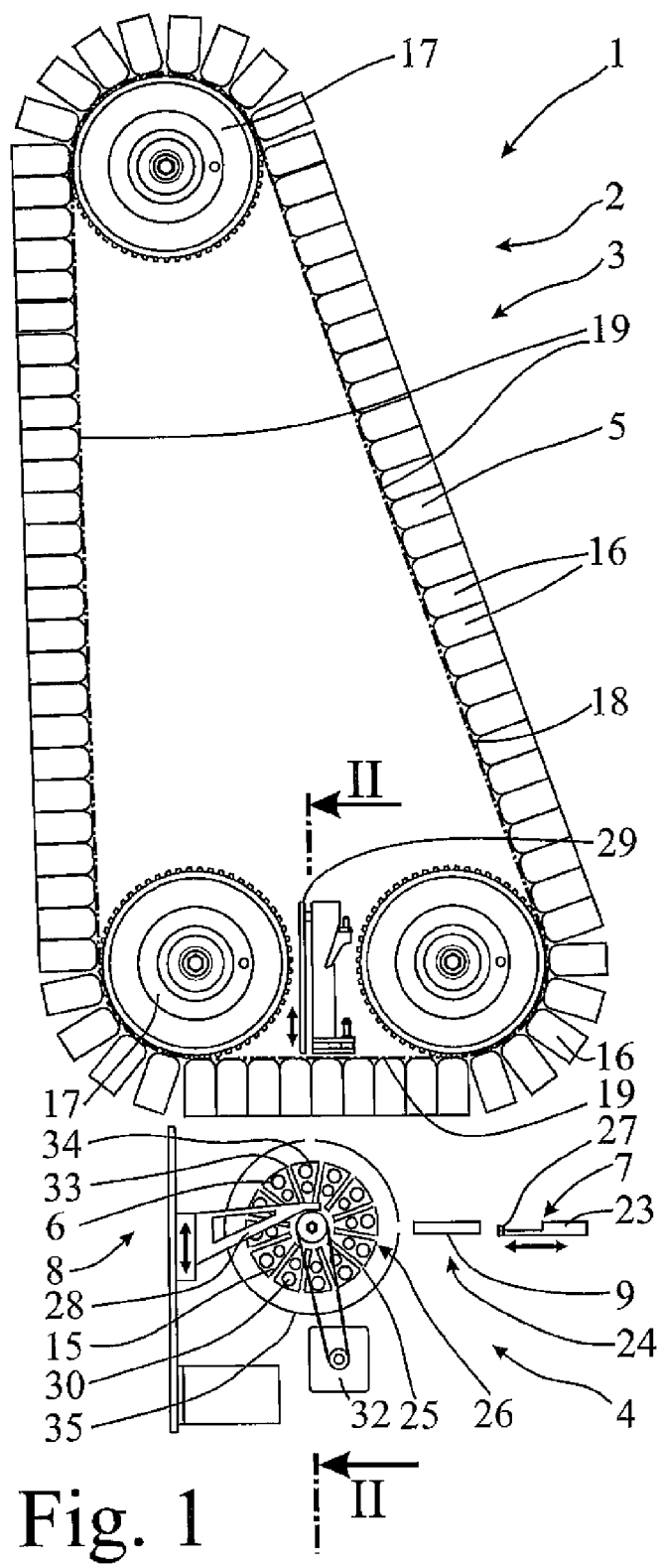
FIG. 1 is a schematic side view of a card mass storage device in interplay with a conveyor section.
Figure 2:
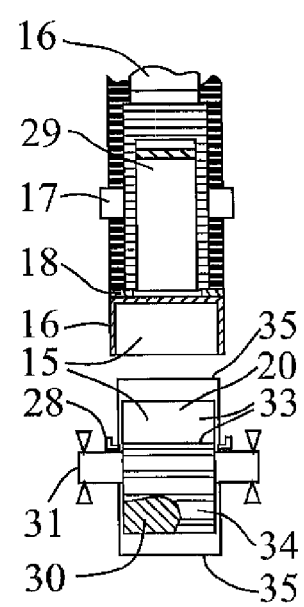
FIG. 2 is a schematic section through the arrangement according to FIG. 1, along the line II-II in FIG. 1.

Referring now in detail to the drawings, the card mass storage device 1 shown in FIGS. 1 and 2 comprises two storage devices 2, a main storage device 3, and an interim storage device 4. In this connection, both the main storage device 3, as a main storage device ring 5, and the interim storage device 4, as an interim storage device ring 6, are configured in ring shape, in each instance, and coupled with one another and with a conveyor section 9 by way of card transfers 7, 8, so that cards can be input from the conveyor section 9, by way of the card transfer 7, to the interim storage device 4, and output from the interim storage device 4, and cards can be input from the interim storage device 4, by way of the card transfer 8, into the main storage device, and output from the main storage device 3.

As shown schematically in FIG. 6, the card mass storage device 1 is disposed on the conveyor section 9, together with two further card mass storage devices 10, 11, which are configured similarly, but in deviating exemplary embodiments can also be configured differently, and forms a card transport 12 together with these two further card mass storage devices 10, 11, having precisely one input 13 and one output 14 of card transport 12.

Both the main storage device 3 and the interim storage device 4 have a plurality of card holders 15, but have a very different structure in themselves.

For example, the main storage device 3 has holding elements 16 that are disposed on a card holder support 18 circulating around three gear wheels 17, in the form of a plastic chain. In this connection, the holding elements 16 are configured in such a manner that they lie closely against one another in linear regions 19 in which the card holder support 18 runs in a straight line, and make available card spaces 20 that are ultimately equidistant. This configuration allows particularly dense or close packing of the cards with a simple control.

As is particularly evident from FIG. 5, each card holder 15 has a card guide 21 that ensures, in each instance, that a card can be securely guided into a specific card space 20 and, if necessary, also guided out of it again. In this connection, it is evident that no card guide is provided on one side of the holding element 16, for the outermost card space 20, whereby this card guide 21 is made available by a card guide 21 of an adjacent holding element 16, when the two holding elements 16 are situated in a linear region 19 and oriented in the same manner next to one another, so that guidance is ensured also with regard to these card spaces 20, and the wall thickness of the individual modules can be optimally selected, in accordance with the existing requirements.

Not shown are separate clamping means, which are inserted into holder slots 22 on the sides of the card spaces, in each instance, as springs, and act resiliently on the cards situated in the card spaces 20, and clamp them in the card holder 15. In this connection, a common metallic spring element is used for the seven card holders 15 of a holding element 16. Here, too, other clamping means, such as spring elements made of other materials, or resilient regions of the holding element 16 itself, can also be used, if applicable.

The card transfer 7 has a pusher 23 that can push a card from a transfer space 24 of the conveyor section 9 into an empty storage device space 25 of the interim storage device 4 when this space is situated at a transfer space 26 of the interim storage device 4 or of the interim storage device ring 6, and can transfer it out of the interim storage device 4 from the transfer space 26 to the transfer space 24 by means of a retractor 27. By means of this configuration, not only the cards on the conveyor section 9 but also the interim storage device 4 can be positioned independent of one another, as long as no transfer is taking place. If, for example, in an alternative embodiment, the conveyor section 9 is laid in such a manner that it intersects the interim storage device 4, a common transfer space is formed, which does allow, on the one hand, doing without the pusher 23 with its retractor 27, but which brings about the result that only either cards on the conveyor section 9 or the interim storage device 4 can be moved, at all times.

As is directly evident, the card transfer 8 also has separate transfer spaces (not numbered individually), which make it possible that both the main storage device 3 and the interim storage device 4 can be moved separately from one another. If corresponding card holders 15 are positioned at the transfer spaces, a card can be lifted out of the interim storage device 4 into the main storage device 3, by means of a lifter 28. Likewise, it is possible to push a card downward out of a card holder 15 of the main storage device 3, by means of a pusher 29, whereby—in order to guarantee clean guidance of the card at all times—the lifter 28 is situated in an upper position when a pusher 29 begins to push a card downward out of a card holder 15 of the main storage device 3. Lifter 28 and pusher 29 then lower the card into the interim storage device 4, essentially holding it together.

The interim storage device ring 6 of the interim storage device 4 comprises a storage device wheel 30 that can be rotated in both directions of rotation, rotating about an axis of rotation 31, by means of a drive 32, in targeted manner. It should be understood that the main storage device ring 5 of the main storage device can also rotate in both directions of rotation, in order to implement the shortest possible path distances to the individual card spaces 20 in this way.

In detail, the storage device wheel 30 has recesses 33 in a cylindrical base body or element 34, which recesses form the card holders 15 of the interim storage device 4, in each instance. In this connection, the cards are held in the cylindrical base body 34 only relatively loosely, or merely by gravity, and secured only by means of a guide plate 35 that encloses the storage device wheel 30 in circular shape and prevents the cards from falling out, as a guide rail. The guide plate 35 has slots in the region of the card transfers 7, 8, in each instance, so that cards can leave the interim storage device 4 or be guided in and out here.

When cards 36 are transported on conveyor spaces 37 of the conveyor section 9, empty conveyor spaces 38 can be left, in targeted manner, which then make it possible to lay cards 36 down there, from one of the card mass storage devices 1, 10, 11, and to convey them further, as indicated schematically in FIG. 6. In this manner, sorting can take place relatively quickly, because in the end result, the only thing that is important is the cards 36 that leave the conveyor section 9 at the output 14 and their sequence.

Figure 7:
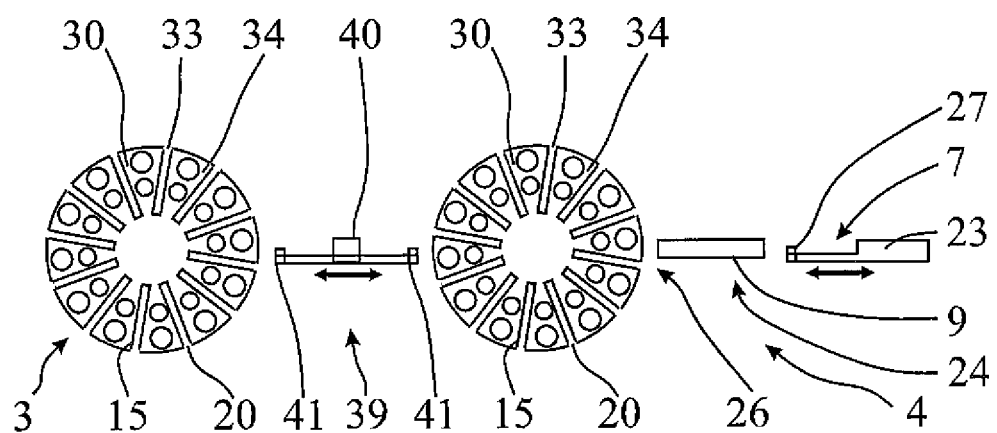
FIG. 7 shows an arrangement of two card storage devices next to a conveyor section.

Card transfers 39, for example having pusher(s) 40 and retractor(s) 41, as indicated schematically in FIG. 7, can also be provided between the card mass storage devices 1, 10, 11, relative to one another, in order to create further sorting possibilities. Likewise, the storage device wheel 30, which is accessible only by way of the card transfer 39, can be outfitted with cards or freed of cards, exclusively by way of the card transfer 39. An arrangement thereby results in which two storage devices, an interim storage device 4 and a main storage device 3, having identical storage devices and, in particular, also having storage devices that have an identical number of card spaces 30, interact with one another.

Although only a few embodiments of the present invention have been shown and described, it is to be understood that many changes and modifications may be made thereunto without departing from the spirit and scope of the invention.

What is claimed is:

1. A card mass storage device comprising:
(a) a circulating card holder support; and
(b) a plurality of card holders disposed on the card holder support;
wherein at least first and second card holders of the plurality of card holders are disposed rigidly relative to one another on a first holding element and at least third and fourth card holders of the plurality of card holders are disposed rigidly relative to one another on a second holding element; and
wherein the first and second holding elements are disposed on the card holder support so as to be movable relative to one another.

2. The card mass storage device according to claim 1, wherein each card holder of the plurality of card holders comprises a card guide and wherein the first holding element is adjacent to the second holding element and for at least the first card holder, a part of the card guide is provided on the second holding element.

3. The card mass storage device according to claim 1, further comprising a card transfer disposed in a linear region of the card holder support where a section of the card holder support moves in a straight line.

4. The card mass storage device according to claim 1, wherein each card holder of the plurality of card holders comprises a clamping device.

5. The card mass storage device according to claim 1, further comprising an interim storage device comprising multiple addressable interim storage device card holders, wherein the interim storage device card holders are disposed rigidly relative to one another and so as to rotate about an axis of rotation in circular form, and wherein the card holders disposed on the card holder support form a main storage device.

6. The card mass storage device according to claim 1, wherein the plurality of card holders are addressable card holders.

7. The card mass storage device according to claim 6, further comprising at least individually addressable first and second main storage devices and/or at least individually addressable first and second interim storage devices.

8. A card mass storage device comprising:
   (a) a first main storage device comprising a first number of card spaces;
   (b) a card transfer for input and output of cards; and
   (c) a first interim storage device disposed between the first main storage device and the card transfer, said first interim storage device having a second number of card spaces, said second number being at least two and not more than the first number;
   wherein the second number of card spaces of the first interim storage device amounts to less than 10% of the first number of card spaces of the first main storage device.

9. A card mass storage device comprising:
   (a) a first main storage device comprising a first number of card spaces;
   (b) a card transfer for input and output of cards; and
   (c) a first interim storage device disposed between the first main storage device and the card transfer, said first interim storage device having a second number of card spaces, said second number being at least two and not more than the first number;
   wherein the second number of card spaces of the first interim storage device amounts to less than 5% of the first number of card spaces of the first main storage device.

10. A card mass storage device comprising:
    (a) a first main storage device comprising a first number of card spaces;
    (b) a card transfer for input and output of cards; and
    (c) a first interim storage device disposed between the first main storage device and the card transfer, said first interim storage device having a second number of card spaces, said second number being at least two and not more than the first number;
    wherein the second number of card spaces of the first interim storage device is less than 3% of the first number of card spaces of the first main storage device.

11. A card mass storage device comprising:
    (a) a first main storage device comprising a first number of card spaces;
    (b) a card transfer for input and output of cards;
    (c) a first interim storage device disposed between the first main storage device and the card transfer, said first interim storage device having a second number of card spaces, said second number being at least two and not more than the first number; and
    (d) at least a second main storage device and a direct or indirect second card transfer between the first interim storage device and the first main storage device and between the first interim storage device and the second main storage device.

12. The card mass storage device according to claim 11, further comprising a second interim storage device.

13. A card mass storage device comprising:
    (a) a first main storage device comprising a first number of card spaces;
    (b) a card transfer for input and output of cards;
    (c) a first interim storage device disposed between the first main storage device and the card transfer, said first interim storage device having a second number of card spaces, said second number being at least two and not more than the first number; and
    (d) at least a second main storage device and a direct or indirect second card transfer between the first and second main storage devices.

\* \* \* \* \*